(12) United States Patent
Kutschi

(10) Patent No.: US 6,170,808 B1
(45) Date of Patent: Jan. 9, 2001

(54) SPRING CORE FOR MATTRESS OR CUSHION

(76) Inventor: Franz Kutschi, Sportplatzstrasse 16, A-8580 Köflach (AT)

( * ) Notice: Under 35 U.S.C. 154(b), the term of this patent shall be extended for 0 days.

(21) Appl. No.: 09/157,614

(22) Filed: Sep. 21, 1998

(30) Foreign Application Priority Data

Dec. 10, 1997 (AT) ........................................................ 405481

(51) Int. Cl.$^7$ ........................................................ F16F 3/00
(52) U.S. Cl. ........................ 267/107; 267/165; 267/149; 5/719; 5/718; 5/247
(58) Field of Search ........................ 267/103, 106, 267/107, 158, 165, 30, 80, 83, 145; 5/242, 247, 255, 718, 719

(56) References Cited

U.S. PATENT DOCUMENTS

| | | | |
|---|---|---|---|
| 88,070 | * 3/1869 | Partello | 5/244 |
| 147,247 | * 2/1874 | Drake | 5/255 |
| 1,630,459 | 5/1927 | Zeidler. | |
| 2,277,853 | 3/1942 | Köhn. | |
| 2,313,171 | 3/1943 | Piliero. | |
| 2,433,012 | * 12/1947 | Zalicovitz | 5/247 |
| 3,506,295 | 4/1970 | Yancey. | |
| 3,633,228 | * 1/1972 | Zysman | 5/353 |
| 3,765,038 | 10/1973 | Curtis. | |
| 3,879,025 | 4/1975 | Dillard. | |
| 3,974,532 | 8/1976 | Ecchuya. | |
| 4,154,786 | * 5/1979 | Plasse | 264/46.4 |
| 4,713,854 | 12/1987 | Graeba. | |
| 4,935,977 | 6/1990 | Yamada. | |
| 5,409,200 | * 4/1995 | Zingher et al. | 267/160 |
| 5,632,473 | * 5/1997 | Dias Magalhaes Queiroz | 267/164 |
| 5,747,140 | * 5/1998 | Heerklotz | 428/131 |
| 5,785,303 | * 7/1998 | Kutschi | 267/103 |

FOREIGN PATENT DOCUMENTS

| | | |
|---|---|---|
| 399 994B | 8/1995 | (AT). |
| 2055173 | 2/1981 | (GB). |
| 2287187 | 9/1995 | (GB). |

\* cited by examiner

*Primary Examiner*—Michael Mar
*Assistant Examiner*—Bradley King
(74) *Attorney, Agent, or Firm*—Fulbright & Jaworski, L.L.P.

(57) ABSTRACT

The invention relates to a spring core for mattresses and seat cushions with leaf springs. The spring core consists of a plurality of spring elements bent up out of passages punched in a plate, with each spring element having an upper and a lower spring clip, with the upper spring clip bent up out of a passage punched in the lower spring clip. The spring elements can also be coated with extruded foam.

8 Claims, 4 Drawing Sheets

SPRING CORE FOR MATTRESS OR CUSHION

BACKGROUND OF THE INVENTION

1. Field of the Invention

The invention relates to a spring core for mattresses and seat cushions with leaf springs.

2. Description of the Related Technology

Spring cores for mattresses and seat cushions with spiral springs are known. These spring cores, which come in various embodiments, are not corrosion-resistant. They cannot be made of plastic but instead must be made only of spring steel wire.

It is also known that foam inserts and various natural fiber inserts with elastic fillers can be used as a substitute for metal spring cores in mattresses and seat cushions. These inserts have the disadvantage of very poor air circulation with the related unfavorable moisture regulation which can develop fungus. The insert material can also suffer from fatigue and deformation. In addition, extensive lathing is necessary for ventilation.

As is apparent in Austrian Patent No. 399,994, spring cores are known with leaf springs consisting of two plates arranged opposite one another with spring elements bent out of them. This design can be used only to a limited extent because the connecting webs between the passages punched in the plates do not permit a point load and thus do not permit limited or local-only deformation.

SUMMARY OF THE INVENTION

Therefore, an object of the present invention is to create a spring core that can be produced from plastic, permits adequate circulation of air, and permits a point load.

These objects are achieved by the fact that the spring core consists of a plurality of spring elements bent up out of passages punched in a plate, where each spring element has an upper and a lower spring clip, with the upper spring clip being bent up out of a passage punched in the lower spring clip.

This embodiment of the spring elements yields a plurality of leaf spring systems, where each spring element can be loaded individually without affecting an adjacent spring element. This yields the special advantage that the spring core according to this invention permits optimum ventilation and a point load.

An especially advantageous embodiment is achieved when the spring core according to this invention is extrusion-coated with foam and the interior of the spring elements is kept free of foam, so the mattress or seat cushion can be ventilated optimally, thus permitting better moisture regulation. In addition, the lathing which has been required in the past can thus be eliminated.

Another especially advantageous embodiment is achieved when isolated spring elements arranged one after the other are extrusion-coated with foam in such a way that the interior of the spring elements is kept free of foam, thus permitting optimum ventilation and flexibility of the mattress.

DETAILED DESCRIPTION OF THE INVENTION

Figure 1:
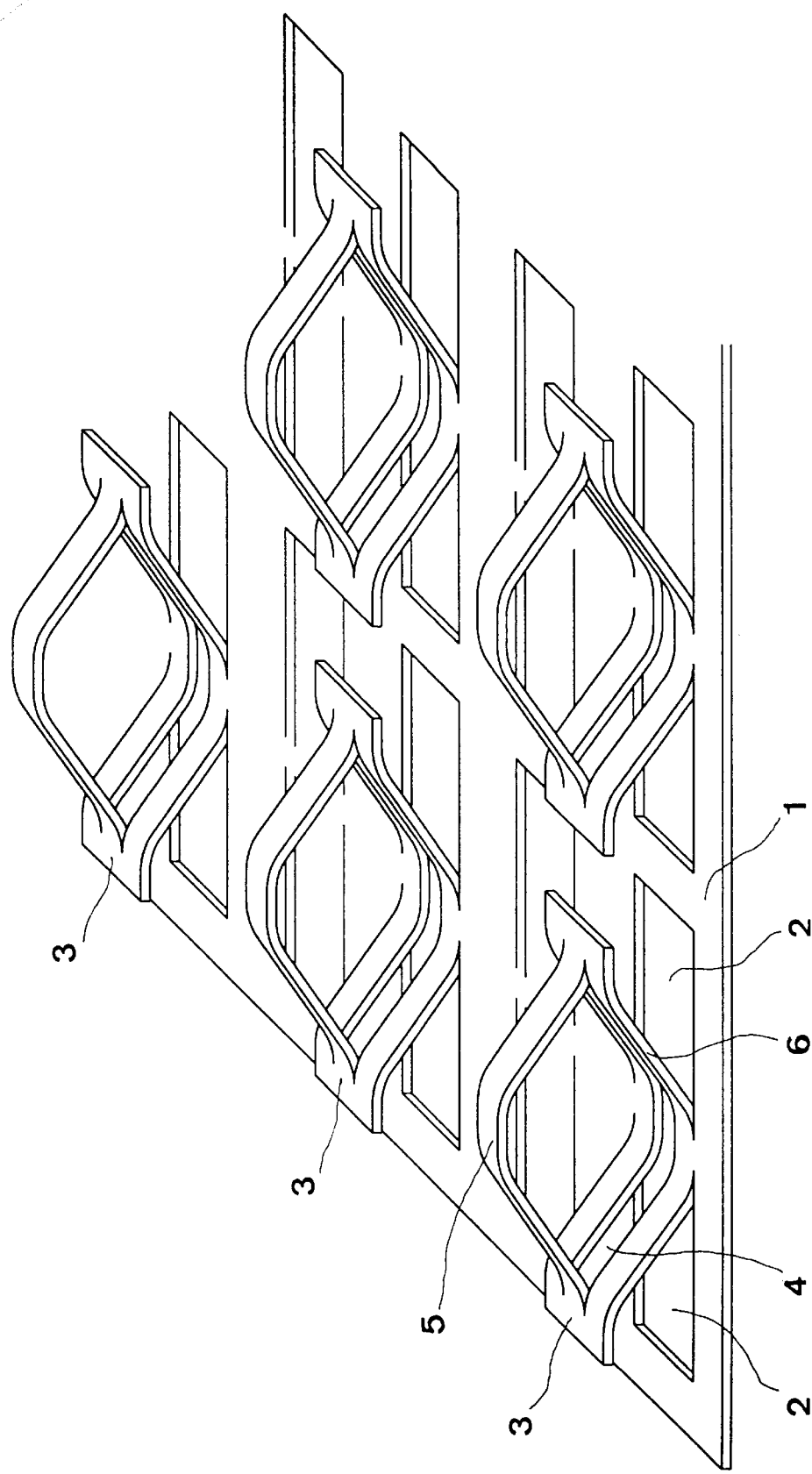
FIG. 1 shows a perspective view of the spring core.

As FIG. 1 shows, the spring core according to this invention can have a plate (1) with the spring elements (3) produced from the punched passages (2), with the spring elements being arranged symmetrically and in rows. The upper spring clips (5) can be bent up out of the punched passages (4) in the lower spring clips (6). This design and arrangement of the spring elements can yield a plurality of leaf spring systems, where each spring element can be loaded individually.

Figure 2:
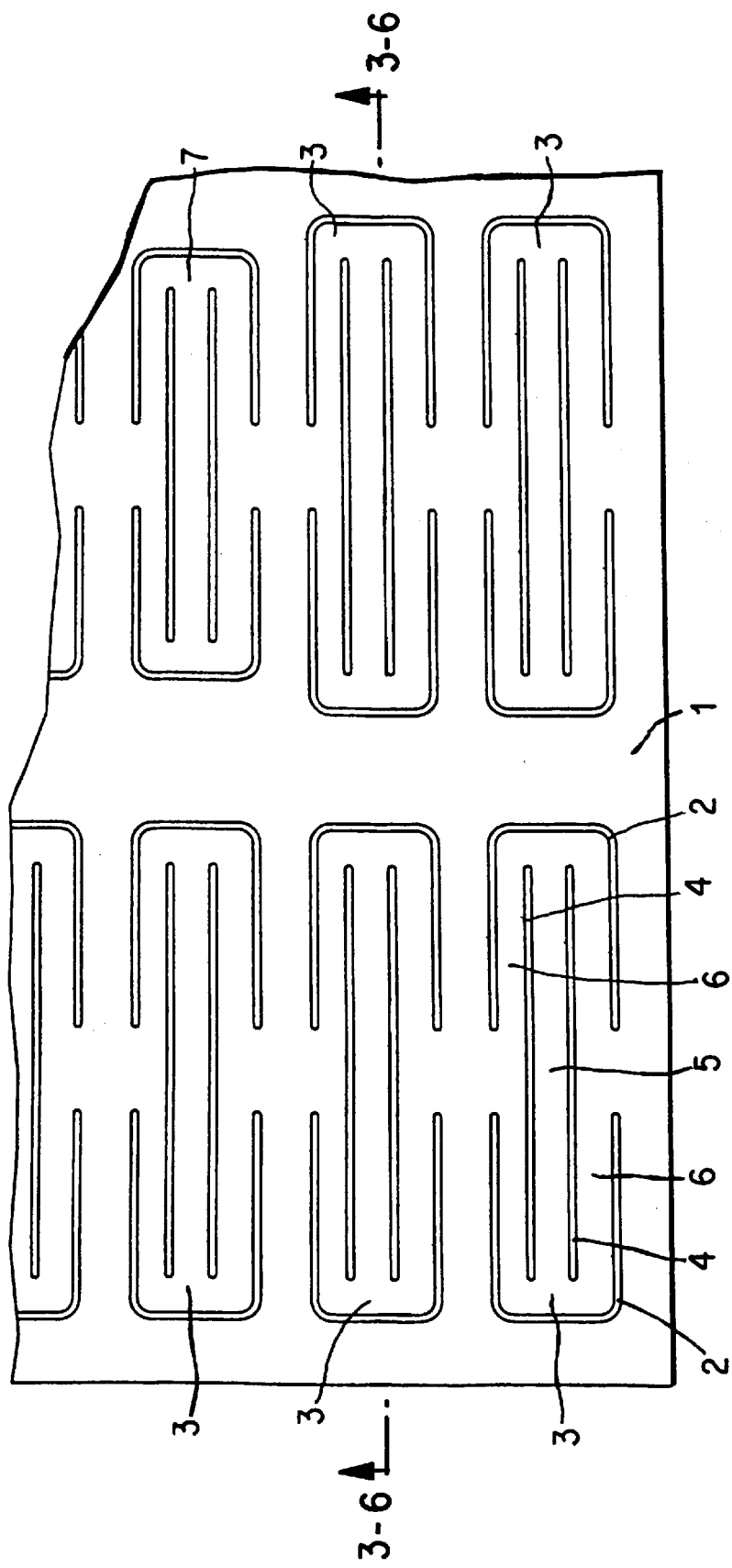
FIG. 2 shows a sectional diagram of the plate.

FIG. 2 shows that the spring core can have a plate (1) with punched passages (2) to form the spring elements (3), with the upper spring clip (5) and the lower spring clip (6) being formed by means of the passages (4). It can also be seen that the dimensions of the spring elements may vary, as illustrated by shorter spring element (7).

Figure 3:
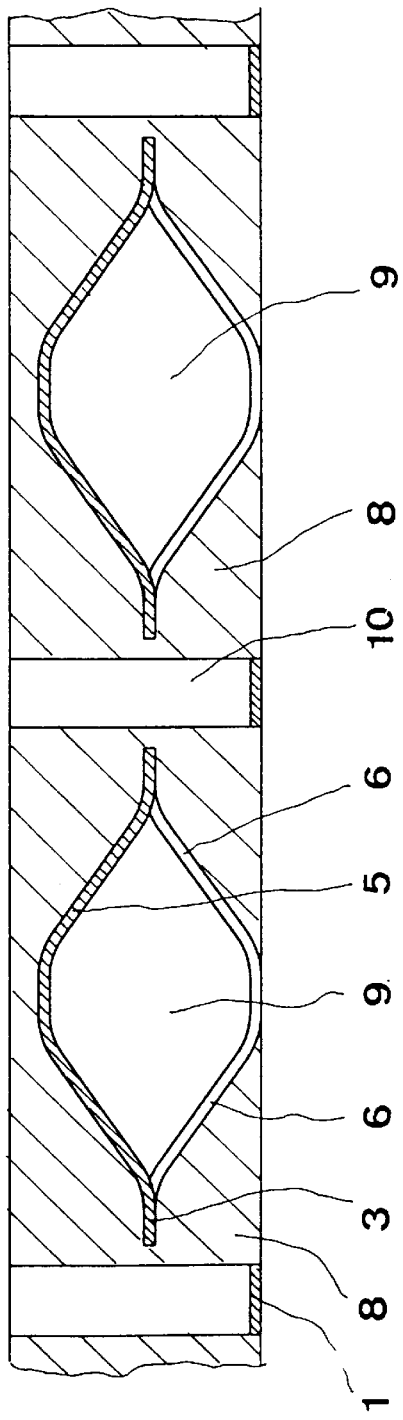
FIG. 3 shows a vertical section of one embodiment of the spring core taken along cut line AA as shown in FIG. 2.

FIG. 3 shows a vertical section of the spring core, formed from a plate (1), with the spring elements (3) extrusion-coated with foam (8) so that the interior (9) of the spring elements (3) is kept free of foam, thus permitting optimum ventilation of the mattress or seat cushion. Furthermore, open areas (10) are also shown, permitting free longitudinal movement ofthe spring elements when a load is applied to the spring elements.

Figure 4:
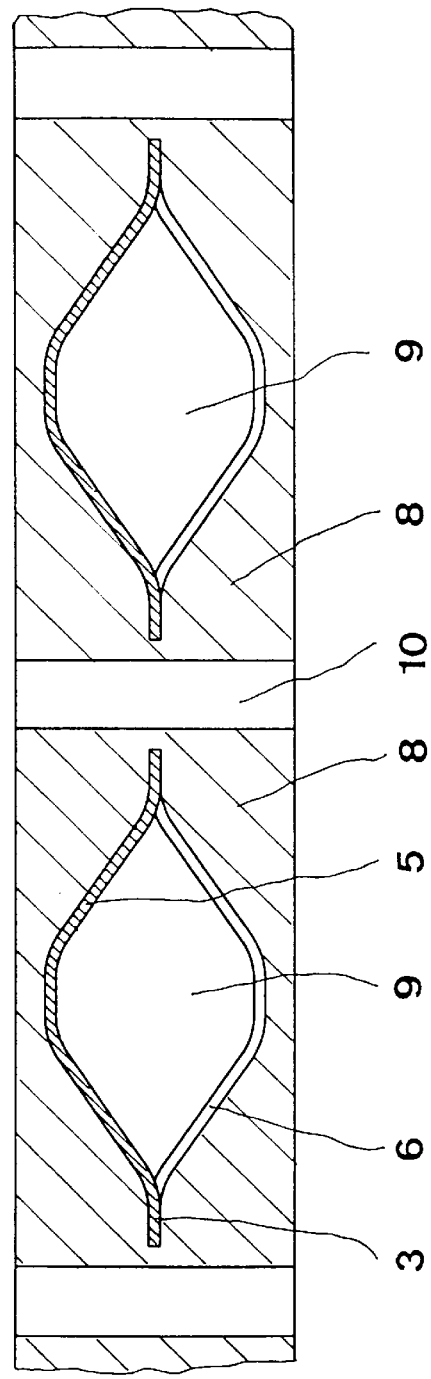
FIG. 4 shows a vertical section of another embodiment of the spring core taken along cut line AA as shown in FIG. 2.

FIG. 4 shows a vertical section through another embodiment, with the individual spring elements (3) consisting of the upper spring clips (5) and the lower spring clips (6), which are extrusion coated with foam (8) so that the interior (9) of the spring elements (3) is kept free of foam. Therefore, the mattress is flexible and permits optimum ventilation. Open areas (10) are shown to permit free longitudinal movement of the spring elements under load.

Figure 5:
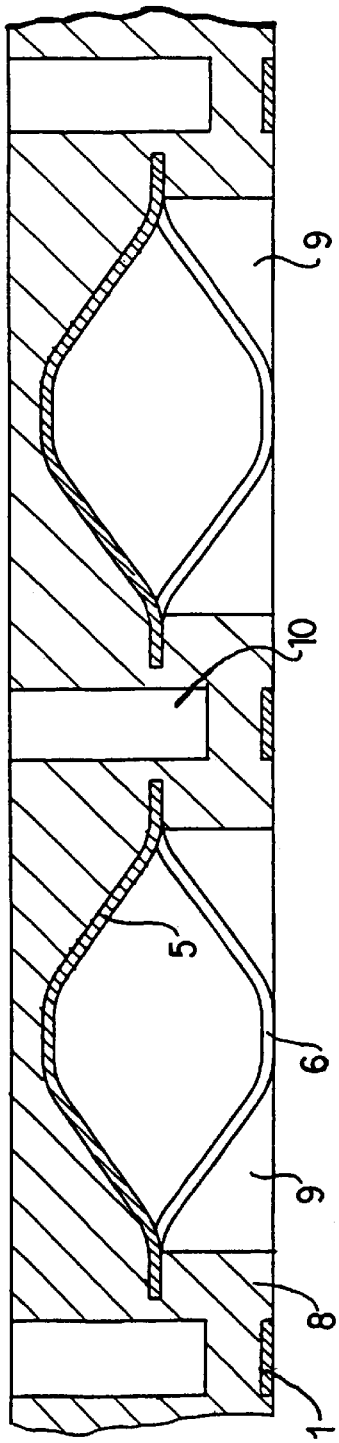
FIG. 5 show a vertical section of a third embodiment of the spring core taken along cut line AA as shown in FIG 2.

FIG. 5 shows an embodiment of the spring core in which the area beneath the lower spring clip (6) is also kept free of extruded foam, allowing additional ventilation.

Figure 6:
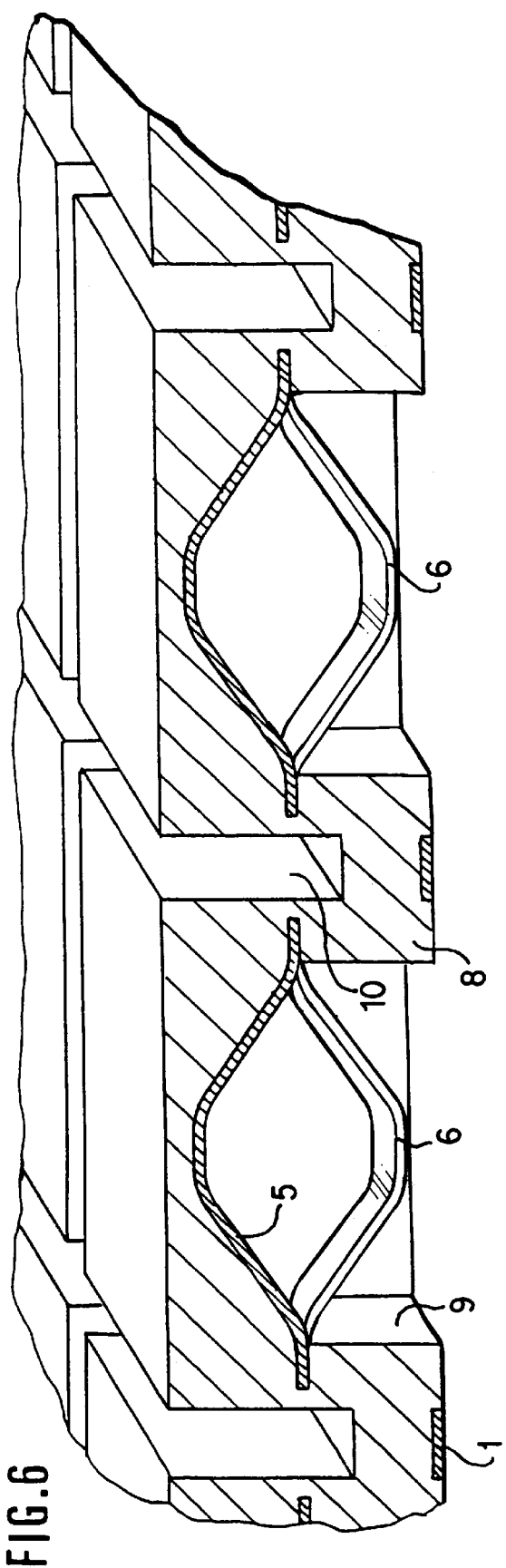
FIG. 6 shows a perspective view of the embodiment of FIG. 5.

FIG. 6 shows a perspective view of the embodiment shown in FIG. 5, and more clearly shows that the foam-free areas (10) between spring elements (3) can be provided on four sides of each spring element (3).

The forgoing description of the invention is intended to be illustrative and not restrictive. Obvious variations will occur to those of skill in the art. These variations are intended to be encompassed by the invention, which is limited only by the scope and spirit of the appended claims.

I claim:

1. A leaf spring core for mattresses and seat cushions comprising:
   a plurality of spring elements bent up out of passages punched in a plate, including a plurality of lower spring clips bent up out of first pairs of said passages punched in said plate and a plurality of upper spring clips bent up out of second pairs of said passages punched in said lower spring clips, and
   a coating of foam,
   wherein said plurality of spring elements contain interior portions which are free of said foam and
   said plurality of lower spring clips and said plate define a plurality of lower exterior spaces that are also free of said foam.

2. The leaf spring core of claim 1, wherein:

said spring elements are spaced apart on said plate in a linear arrangement.

3. A method of forming a leaf spring core, comprising the steps of:

producing a plate with at least one set of passages, each set defining first and second portions of said plate;

forming a lower spring clip by bending said first portion;

forming an upper spring clip by bending said second portion attached to said first portion, wherein said lower spring clip and said upper spring clip form a spring element;

defining an interior space formed between said lower spring clip and said upper spring clip;

defining an exterior space formed between said lower spring clip and said plate;

coating said spring element with foam;

leaving said interior space essentially free of foam; and leaving said exterior space essentially free of foam.

4. The method of claim 3, wherein the step of producing a plate includes punching said passages from said plate.

5. A spring core for mattresses and cushions, comprising:

a plurality of separate spring elements arranged on a plate in a planar configuration and separated from each other by a space, each of said spring elements including:

a lower spring clip approximately shaped as a leaf spring;

an upper spring clip approximately shaped as an inverted leaf spring and attached to said lower spring clip;

a coating of foam;

an interior formed between said lower spring clip and said upper spring clip and an exterior space between said lower spring clip and said plate being substantially free of said foam, wherein said upper spring clip and said lower spring clip are formed from a single planar piece of material.

6. A method of forming a spring core, comprising the steps of:

producing a plate with at least one set of passages, each set of passages defining a spring-producing area;

forming a lower spring clip by bending a first portion of said spring-producing area;

forming an upper spring clip by bending a second portion of said spring-producing area attached to said first portion;

defining an interior formed between said lower spring clip and said upper spring clip;

surrounding said spring element with foam;

leaving said interior essentially free of foam; and leaving an area between said lower spring clip and said plate essentially free of foam.

7. The method of claim 6, wherein the step of forming a lower spring clip further includes the step of bending a first portion of said spring-producing area attached to said plate.

8. The method of claim 6, wherein the step of producing a plate includes punching said passages from said plate.

* * * * *